United States Patent
Markley et al.

(10) Patent No.: US 7,455,606 B2
(45) Date of Patent: Nov. 25, 2008

(54) MECHANICAL CHAIN TENSIONER WITH A ROTATIONAL RATCHETING DEVICE

(75) Inventors: George L. Markley, Montour Falls, NY (US); Sam A. Kuznets, Burdett, NY (US)

(73) Assignee: BorgWarner Inc., Auburn Hills, MI (US)

( * ) Notice: Subject to any disclaimer, the term of this patent is extended or adjusted under 35 U.S.C. 154(b) by 717 days.

(21) Appl. No.: 11/147,516

(22) Filed: Jun. 8, 2005

(65) Prior Publication Data

US 2006/0281594 A1 Dec. 14, 2006

(51) Int. Cl.
F16H 7/08 (2006.01)
F16H 7/22 (2006.01)

(52) U.S. Cl. .................. 474/109; 474/110; 474/111

(58) Field of Classification Search .............. 474/101, 474/109–111
See application file for complete search history.

(56) References Cited

U.S. PATENT DOCUMENTS

| | | | |
|---|---|---|---|
| 3,426,606 A | 2/1969 | Hopkins | |
| 3,490,302 A | 1/1970 | Turner et al. ............. | 74/242.11 |
| 3,830,114 A | 8/1974 | Daines | |
| 4,268,012 A * | 5/1981 | Ruehle et al. ............ | 254/223 |
| 4,395,251 A | 7/1983 | King et al. .............. | 474/111 |
| 4,921,472 A | 5/1990 | Young .................... | 474/111 |
| 5,152,552 A | 10/1992 | Ikegaya | |
| 5,797,818 A | 8/1998 | Young .................... | 474/111 |
| 5,967,921 A | 10/1999 | Simpson et al. .......... | 474/110 |
| 6,110,063 A | 8/2000 | Okabe et al. ............ | 474/111 |
| 6,120,402 A | 9/2000 | Preston et al. | |
| 6,146,300 A * | 11/2000 | Suzuki et al. ........... | 474/111 |
| 6,193,622 B1 * | 2/2001 | Cressman et al. ........ | 474/109 |
| 6,238,311 B1 | 5/2001 | Cutting | |
| 6,244,981 B1 | 6/2001 | Simpson ................. | 474/110 |
| 6,478,703 B2 | 11/2002 | Suzuki .................. | 474/101 |
| 6,547,684 B2 | 4/2003 | Kurohata ............... | 474/111 |
| 6,612,951 B2 | 9/2003 | Kurohata ............... | 474/109 |
| 6,623,391 B2 | 9/2003 | Young et al. | |
| 6,849,015 B2 * | 2/2005 | Markley et al. .......... | 474/111 |
| 7,338,399 B2 | 3/2008 | Garbagnati | |

FOREIGN PATENT DOCUMENTS

| | | |
|---|---|---|
| DE | 2550639 | 5/1977 |
| EP | 0581219 A1 | 2/1994 |

(Continued)

*Primary Examiner*—Lynda Jasmin
*Assistant Examiner*—Anna Momper
(74) *Attorney, Agent, or Firm*—Brown & Michaels, PC (57) ABSTRACT

A blade tensioner comprising a blade shoe with a proximal end pivotally attached to the bracket and a distal end of a clevis shape having a raised portion and a recessed portion for receiving a semicircular ratchet wheel, with an edge of the raised portion defined by a radial journal in between a pair of shoulders. The ratchet wheel is pivotally attached to the recessed portion of the distal end of the blade shoe having a plurality of ratchet teeth, a pair of shoulders, and a reduced diameter portion forming a bearing surface with the radial journal of the raised portion of the distal end. A ramp surface having a plurality of ramp teeth that receives the ratchet teeth of the ratchet wheel and allows freedom of movement in the direction of the pivot pin, but limits movement in the opposite direction to the designated backlash.

15 Claims, 10 Drawing Sheets

FOREIGN PATENT DOCUMENTS

| | | |
|---|---|---|
| EP | 0867600 A2 | 9/1998 |
| EP | 1096174 A1 | 5/2001 |
| FR | 1358841 A | 4/1964 |
| JP | 62-188812 | 8/1987 |
| JP | 63-062946 | 3/1988 |
| JP | 08226503 | 9/1996 |
| JP | 10002386 | 1/1998 |
| JP | 2000136861 | 5/2000 |
| JP | 2001208151 | 8/2001 |
| JP | 2004044749 | 2/2004 |

* cited by examiner

Fig. 1

PRIOR ART

Fig. 2

PRIOR ART

PRIOR ART

PRIOR ART

Fig. 5

PRIOR ART

MECHANICAL CHAIN TENSIONER WITH A ROTATIONAL RATCHETING DEVICE

REFERENCE TO RELATED APPLICATIONS

The contents of this application are related to copending application Ser. No. 11/108,449, entitled "TENSIONER WITH A RATCHETING DEVICE," filed on Apr. 18, 2005, which is hereby incorporated by reference.

BACKGROUND OF THE INVENTION

1. Field of the Invention

The invention pertains to the field of chain tensioners. More particularly, the invention pertains to a chain tensioner with a rotational ratcheting device.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the un-meshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain slack to vary between excessively high or low levels. During prolonged use, wear to the components of the power transmission system can cause an increase in chain slack. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain when the chain is slack, and must be very rigid when the chain tightens.

Figure 1:
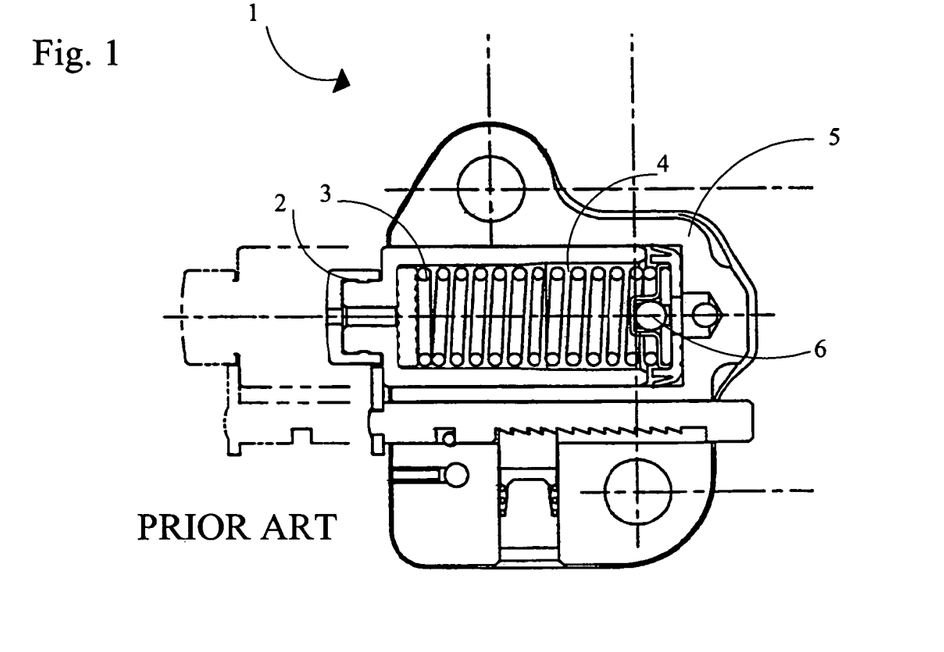
FIG. 1 shows a prior art blade tensioner.

To accomplish this result, a hydraulic tensioner 1, as shown in prior art FIG. 1, typically comprises a rod or cylinder as a piston 2, which is biased in the direction of the chain by a tensioner spring 3. The piston 2 is housed within a cylindrical housing 5, having an interior space which is open at the end facing the chain and closed at the other end. The interior space of the housing contains a pressure chamber 4 in connection with a reservoir or exterior source of hydraulic fluid pressure. The pressure chamber 4 is typically formed between the housing 5 and the piston 2, and it expands or contracts when the piston 2 moves within the housing 5.

Typically, valves are employed to regulate the flow of fluid into and out of the pressure chamber. For instance, an inlet check valve 6 typically includes a ball-check valve that opens to permit fluid flow in to the pressure chamber 4 when the pressure inside the chamber has decreased as a result of outward movement of the piston 2. When the pressure in the pressure chamber is high, the inlet check valve closes, preventing fluid from exiting the pressure chamber. The closing of the inlet check valve 6 prevents the piston chamber from contracting, which in turn prevents the piston from retracting, achieving a so-called "no-return" function.

Many tensioners also employ a pressure relief mechanism that allows fluid to exit the pressure chamber when the pressure in the chamber is high, thus allowing the piston to retract in response to rapid increases in chain tension. In some tensioners, the pressure relief mechanism is a ball check valve. The check valve opens when the pressure exceeds a certain pressure point. Some tensioners may employ a valve which performs both the inlet check function as well as the pressure relief function.

Other mechanisms employ a restricted path through which fluid may exit the fluid chamber, such that the volume of flow exiting the fluid chamber is minimal unless the pressure in the fluid chamber is great. For instance, a restricted path may be provided through the clearance between the piston and bore, through a vent tube in the protruding end of the piston, or through a vent member between the fluid chamber and the fluid reservoir.

A hydraulic tensioner as used with a tensioner arm or shoe is shown in Simpson et al., U.S. Pat. No. 5,967,921, incorporated herein by reference. Hydraulic chain tensioners typically have a plunger slidably fitted into a chamber and biased outward by a spring to provide tension to the chain. A lever, arm or shoe is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements of the plunger are easy in one direction (outward) but difficult in the reverse direction.

Blade tensioners are tensioners that are commonly used to control a chain or belt where load fluctuations are not so severe as to over flex the spring or springs.

A ratchet with backlash is added to tensioners to limit the effective backward or untensioned travel of a tensioning device.

Figure 2:
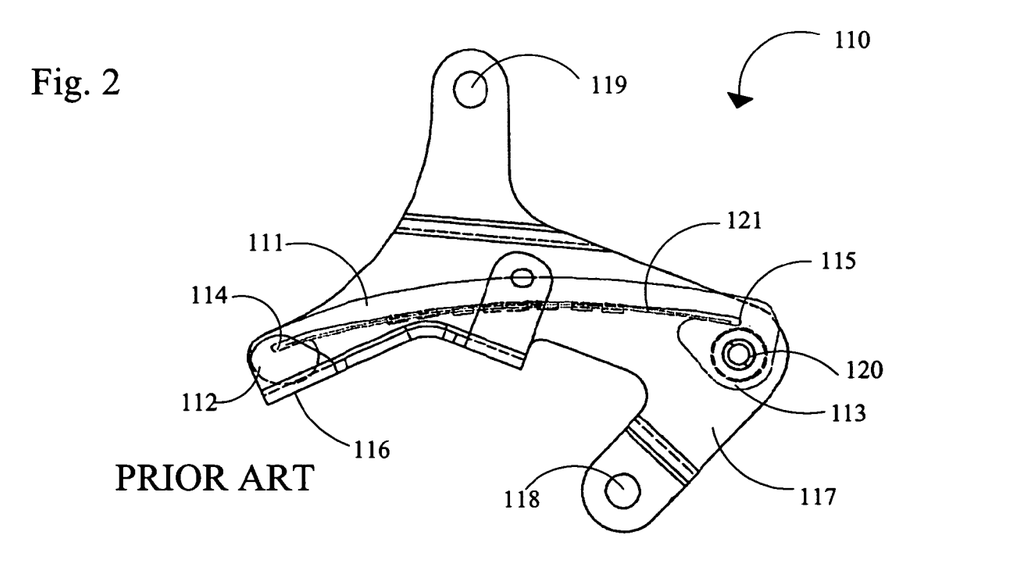
FIG. 2 shows a prior art hydraulic tensioner.

Prior art FIG. 2 is an example of a blade tensioner. The conventional blade tensioner 110 includes a blade shoe 111 made of resin having a curved chain sliding face and numerous blade springs 121, preferably made of metallic material. The blade springs 121 are arranged in layers on the opposite side of the blade shoe 111 from the chain sliding face, and provide spring force to the blade shoe 111. The ends of each spring-shaped blade spring 121 are inserted in the indented portions 114 and 115, which are formed in the distal portion 112 and proximal portion 113 of the blade shoe 111, respectively.

A bracket 117 is provided for mounting the blade tensioner 110 in an engine. Holes 118 and 119 are formed in the bracket 117, and mounting bolts are inserted into these holes 118 and 119. A sliding face 116 contacts the distal portion of the blade shoe 111 and permits sliding. The slide face 116 is formed on the distal portion of the bracket 117. A pin 120 supports the proximal portion 113 of the blade shoe 111 so that it may move in either direction. The pin 120 is secured on the bracket 117.

Figure 3:
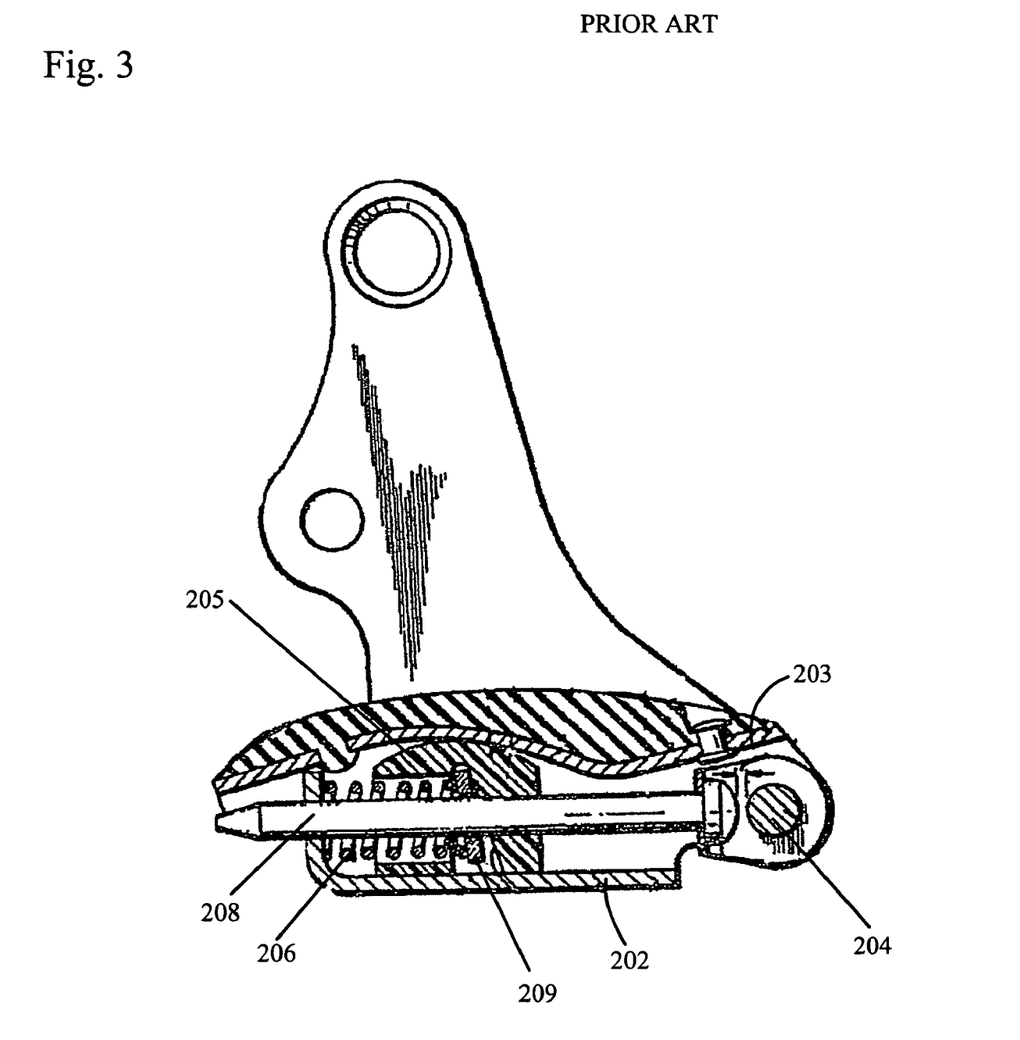
FIG. 3 shows another prior art tensioner.

FIG. 3 shows a chain tensioning device that has a pair of arms 202, 203 which are joined by a pivot 204. The arms 202, 203 are urged apart so that arm 203 applies tensioning force to a chain (not shown) by means of a spring 206 loaded cam block 205. To prevent collapse of arm 203 during load reversals of the chain, a catch disc 209 and rod are arranged to prevent return movement of the spring loaded cam block 205.

Figure 4:
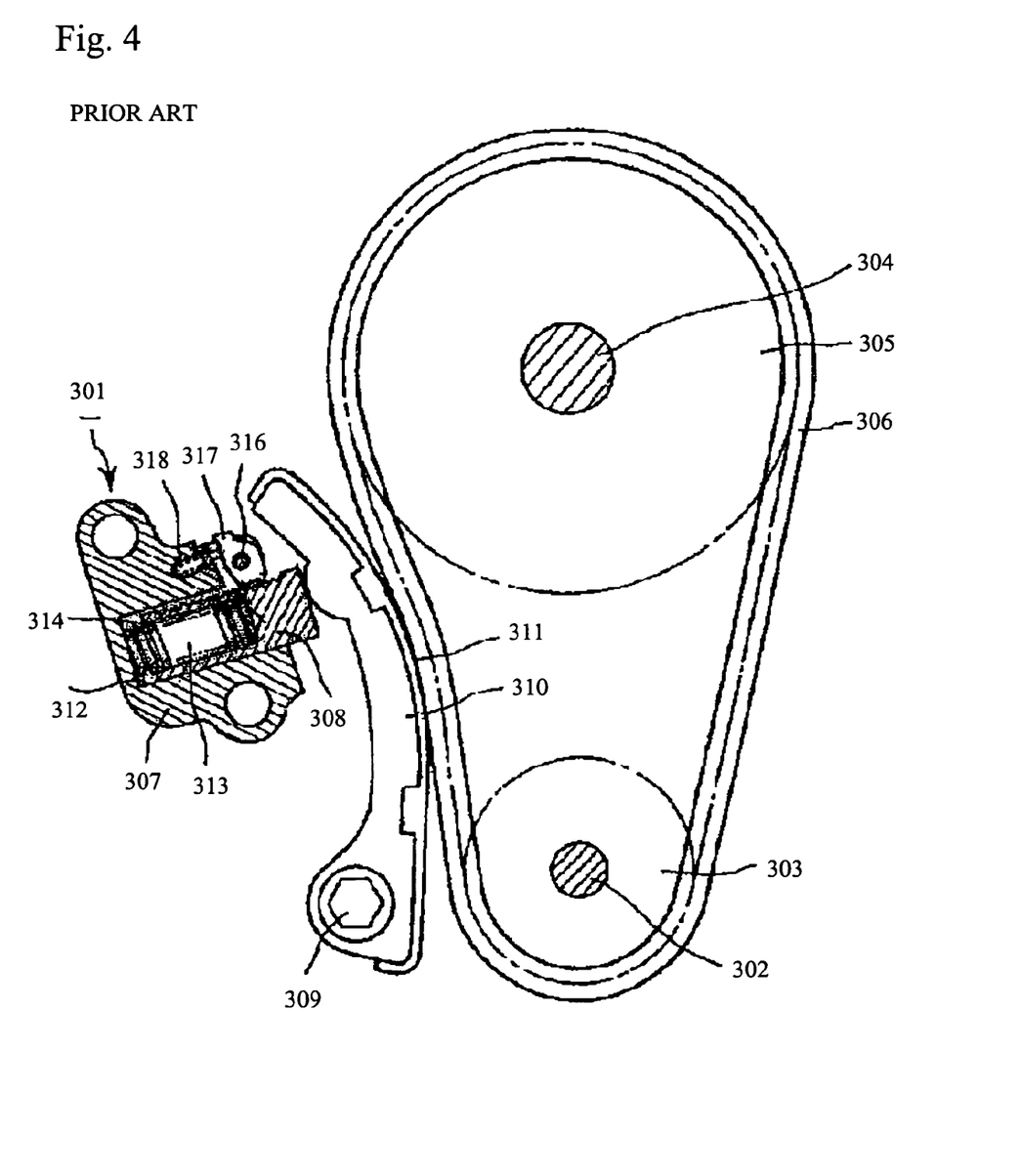
FIG. 4 shows a prior art ratcheting tensioner.

FIG. 4 shows an example of a tensioner that uses a ratchet device. The ratchet tensioner 301 comprises a tensioner housing 307 having a hole 312 for receiving a plunger 308 and a ratchet pawl 317 pivoted by a shaft 316 to the tensioner housing 307 and biased by a ratchet spring 318. The plunger 308 has teeth on one outer side that engage the ratchet pawl 317. The plunger 308 is biased out of the hole 312 to contact the tension lever 310 by fluid in the hollow section 313 and by the plunger spring 314. The tensioner lever 310 pivots on support shaft 309 and has a shoe surface 311 that contacts and applies tension to the slack side of the timing chain 306 wrapped around the camshaft 304 and its sprocket 305 and the crankshaft 302 and its sprocket 303. The plunger's 308 movement in and out of the hole 312 is limited by its teeth and the ratchet pawl 317 that engage them.

Figure 5:
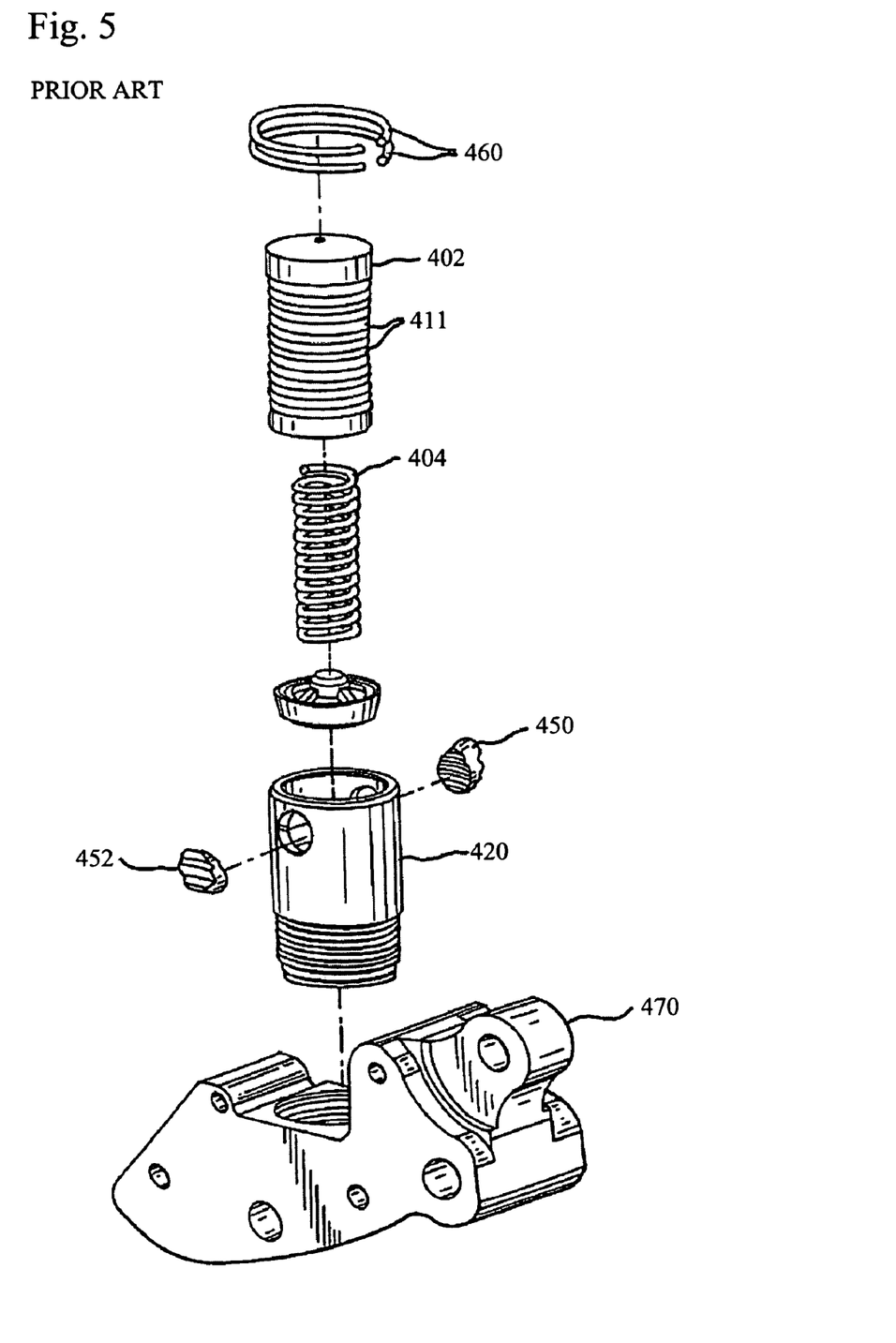
FIG. 5 shows a prior art a prior art tensioner with a ratcheting device.

Prior art FIG. 5 is a tensioner that uses a ratchet device. The tensioner includes a housing 470 having a bore 420 that receives a pair of pawls 450, 452 held in place by circlip 460. A piston 402, with grooves 411, is slidably received within bore 420 and is biased in a protruding direction from the bore 420 by spring 404. The grooves 411 of the piston engage the teeth of pawls 450, 452.

Other tensioners may also use a ratchet wheel to tension the chain as shown in U.S. Pat. No. 6,193,622 and U.S. Pat. No. 6,110,063.

Figure 6:
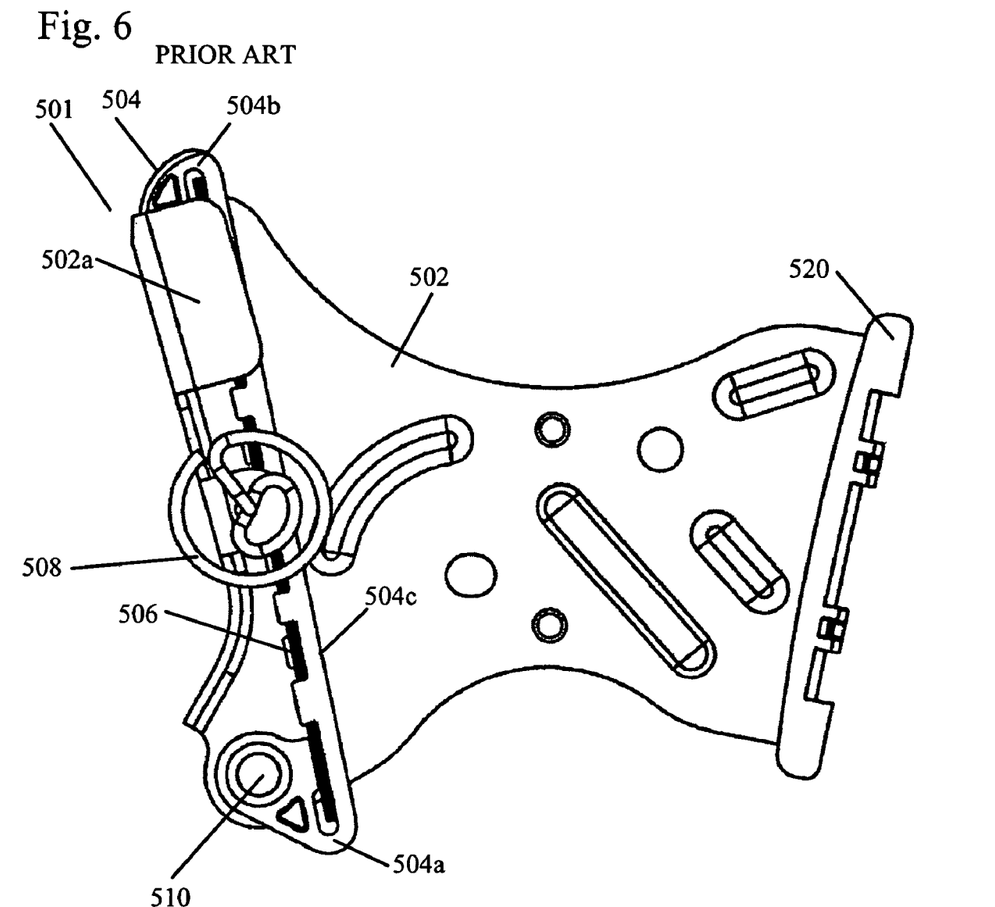
FIG. 6 shows a prior art blade tensioner and bracket.

FIG. 6 shows a prior art blade tensioner with bracket 502 that has a tensioner 501 attached to one side of the bracket and a snubber 520 attached to the other side to guide the chain (not shown). The tensioner is comprised of a blade shoe 504 having an arcuately curved chain sliding face 504c, a distal end 504b, and a proximal end 504a. The proximal end 504a of the blade shoe pivots on pivot pin 510 of the bracket 502. A blade spring 506 is placed between the blade shoe 504 and the bracket 502. The blade spring 506 runs along the length of the blade shoe (e.g. from the distal end to the proximal end). A tab 502a, integral to the bracket 502 is bent up away from the bracket and towards the center of the bracket. The tab 502a prevents the proximal end 504a of the blade shoe from disengaging pivot pin 510 of the bracket 502. The distal end portion 504b of the blade shoe 504 slides on the inner ramp surface (not shown) of the bent portion of the bracket 502 that forms tab 502a. When the slack in the chain (not shown) increases, the distal end portion 504b of the blade shoe 504 slides on inner ramp surface of the bent portion of the bracket 502, towards pivot pin 510, causing the blade shoe 504 to slightly bow out towards the chain and thus tension the chain. Pin 508 locks or maintains the tensioner's position for shipping.

The prior art does not show an adequate means of adding a ratcheting device to the tensioner arm of a blade tensioner.

SUMMARY OF THE INVENTION

A blade tensioner comprising a blade shoe with a proximal end pivotally attached to the bracket and a distal end of a clevis shape having a raised portion and a recessed portion for receiving a semicircular ratchet wheel, with an edge of the raised portion defined by a radial journal in between a pair of shoulders. The ratchet wheel is pivotally attached to the recessed portion of the distal end of the blade shoe having a plurality of ratchet teeth, a pair of shoulders, and a reduced diameter portion forming a bearing surface with the radial journal of the raised portion of the distal end. A ramp surface having a plurality of ramp teeth receives the ratchet teeth of the ratchet wheel in the distal end of the blade shoe and allows freedom of movement in the direction of the pivot pin, but limits movement in the opposite direction to the designated backlash.

When the slack of the chain increases, or the load in the chain decreases, the distal end of the blade shoe moves toward the pivot pin or away from the chain and the ratchet wheel rotates until the outer shoulder of the wheel contacts the outer shoulder of the raised portion of the distal end portion, causing the ratchet teeth to slide down the ramp teeth, towards the pivot pin and the blade shoe to bow out to tension the chain.

When the slack of the chain decreases or the load on the chain increases, the distal end of the blade shoe moves away from the pivot pin or towards the chain and the ratchet teeth of the ratchet wheel slide up the teeth of the ramp surface until the ratchet wheel rotates and the inner shoulder of the wheel contacts the inner shoulder of the raised portion of the distal end portion and the ratchet wheel teeth abut with a tooth of the ramp surface. Further movement in this direction is prohibited by both the abutment of the ratchet wheel teeth with the teeth of the ramp surface and the abutment of the inner shoulder of the ratchet wheel with the inner shoulder of the raised portion of the distal end.

The backlash of the system is the combination of the angle the ratchet wheel rotates when going from a first position where the outer shoulder of the ratchet wheel and the outer shoulder of the raised portion of the distal end are in contact, to a second position where the inner shoulder of ratchet wheel and the inner shoulder of the raised portion of the distal end are in contact, as well as the distance the ratchet wheel tooth slides on a ramp tooth before abutting a shoulder and the radius of the ratchet wheel. The angle at which the ratchet wheel rotates and the length of the ramp tooth are a predetermined portion of the total backlash.

The bracket further comprises a snubber attached opposite the ramp for slidably receiving the distal end portion of the blade shoe. The ramp has an upper portion and a lower portion. When the chain is new, the plurality of ratchet teeth slide on the upper portion of the ramp and the when the chain is worn, the plurality of ratchet teeth slide on the lower portion of the ramp.

DETAILED DESCRIPTION OF THE INVENTION

Figure 7:
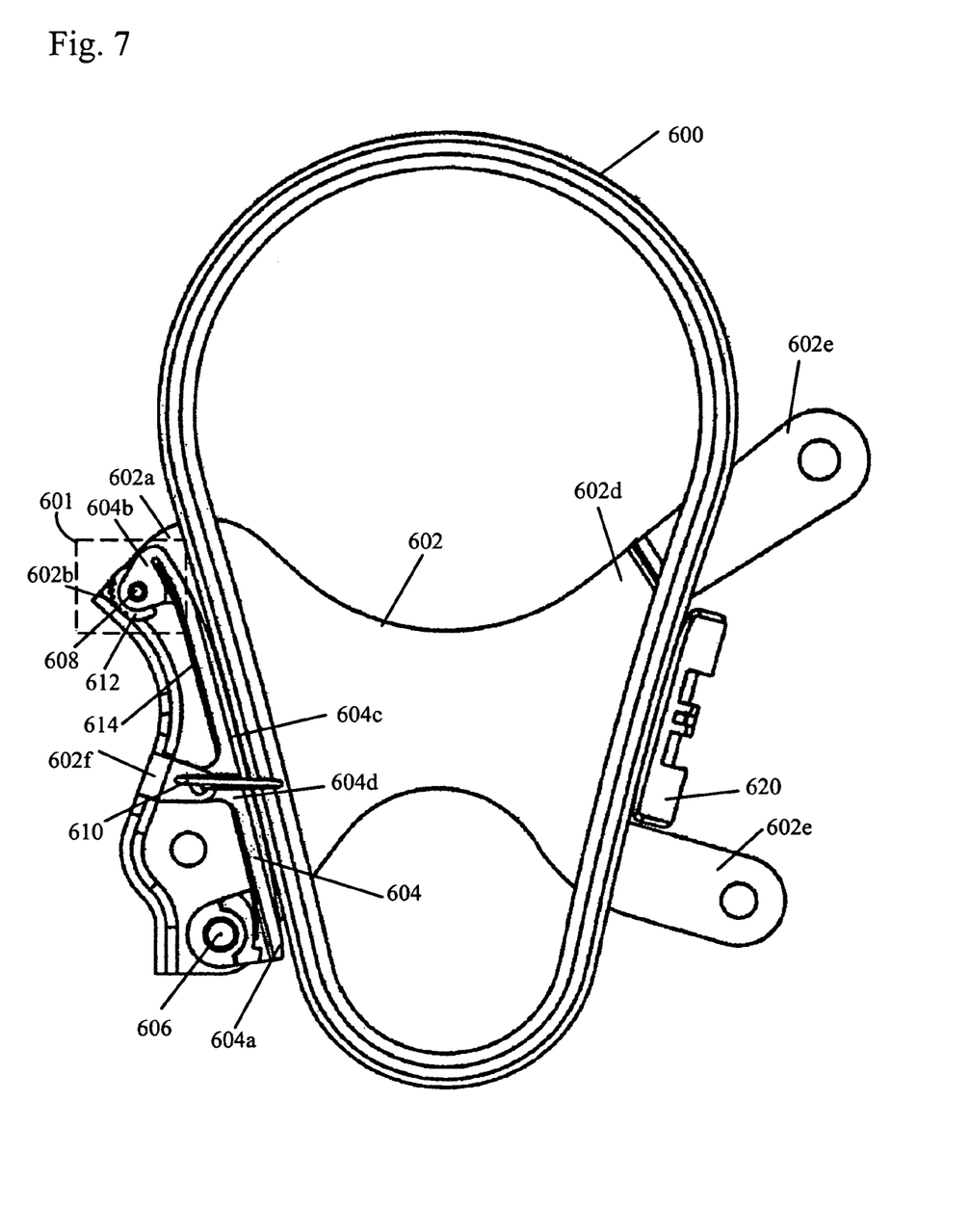
FIG. 7 shows a schematic of the tensioner of the present invention with a new chain.

FIG. 7 shows a schematic of the blade tensioner with a chain 600. The tensioner and the guide 620 are attached to the bracket 602. The tensioner is comprised of a blade shoe 604 having an arcuately curved chain sliding face 604c, a distal end 604b, and a proximal end 604a. The proximal end 604a of the blade shoe pivots on pivot pin 606 of bracket 602. A blade spring 614 is placed between the blade shoe 604 and the bracket 602. The blade spring 614 is placed within the blade shoe. The blade spring 614 runs along the length of the blade shoe (e.g. from the distal end to the proximal end). The blade spring 614 may consist of a single blade spring or multiple blade springs.

The guide 620 is attached to the guide side 602d of the bracket 602. The guide 620 is preferably stationary and fixedly attached, and aids in maintaining chain 600 placement with respect to the blade shoe 604 on the opposite side of the bracket 602. Tabs 602e of the bracket 602 receive bolts for securing the bracket 602 to a surface, such as the engine block. The tensioner is secured to the tensioner side 602a of the bracket 602.

Figure 8:
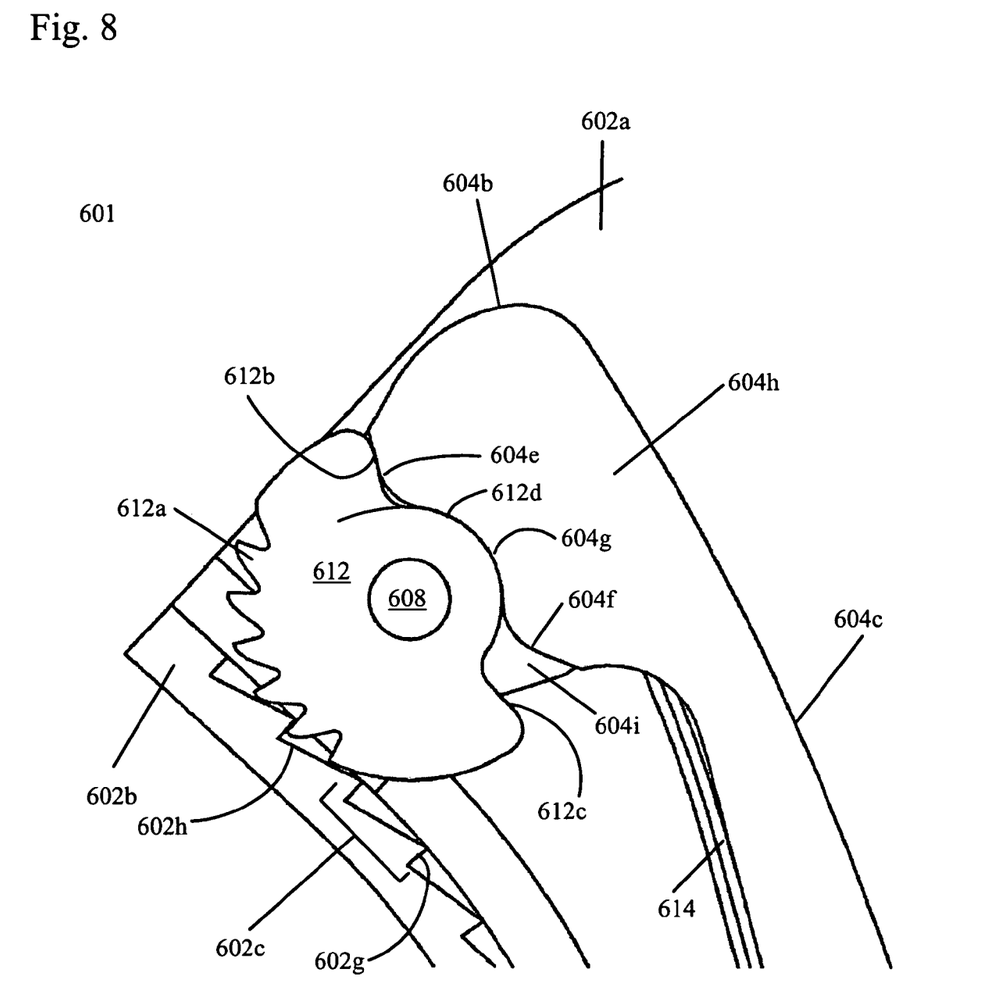
FIG. 8 shows a close-up of the ratcheting portion of the tensioner of FIG. 7.

Attached to a recessed portion 604i or the clevis of the distal end 604b of the blade shoe by a ratchet wheel pin 608 is a ratchet wheel 612 with ratchet teeth 612a. The ratchet wheel 612 is a semicircle in which the semicircular portion contains the ratchet teeth 612a and the opposite straight or flat side has shoulders 612b and 612c as shown in FIG. 8. In between the shoulders 612b, 612c of the ratchet wheel 612 is a reduced diameter forming a bearing surface 612d for transferring the radial load of the ratchet wheel 612 to a like radial journal 604g of the distal end portion of the blade shoe. The ratchet wheel pin 608 passes through oversized collinear holes in the distal end 604b of the blade shoe 604, which straddle the ratchet wheel 612. The ratchet wheel pin 608 also passes through a tight fit hole in the ratchet wheel 612, locking the ratchet wheel 612 within the clevis of the distal end portion 604b. The shoulders 604e, 604f of the distal end portion 604b may come in contact with the shoulders 612b, 612c of the ratchet wheel 612, restricting the rotation of the semicircular ratchet wheel 612 to a predetermined backlash amount.

Figure 10:
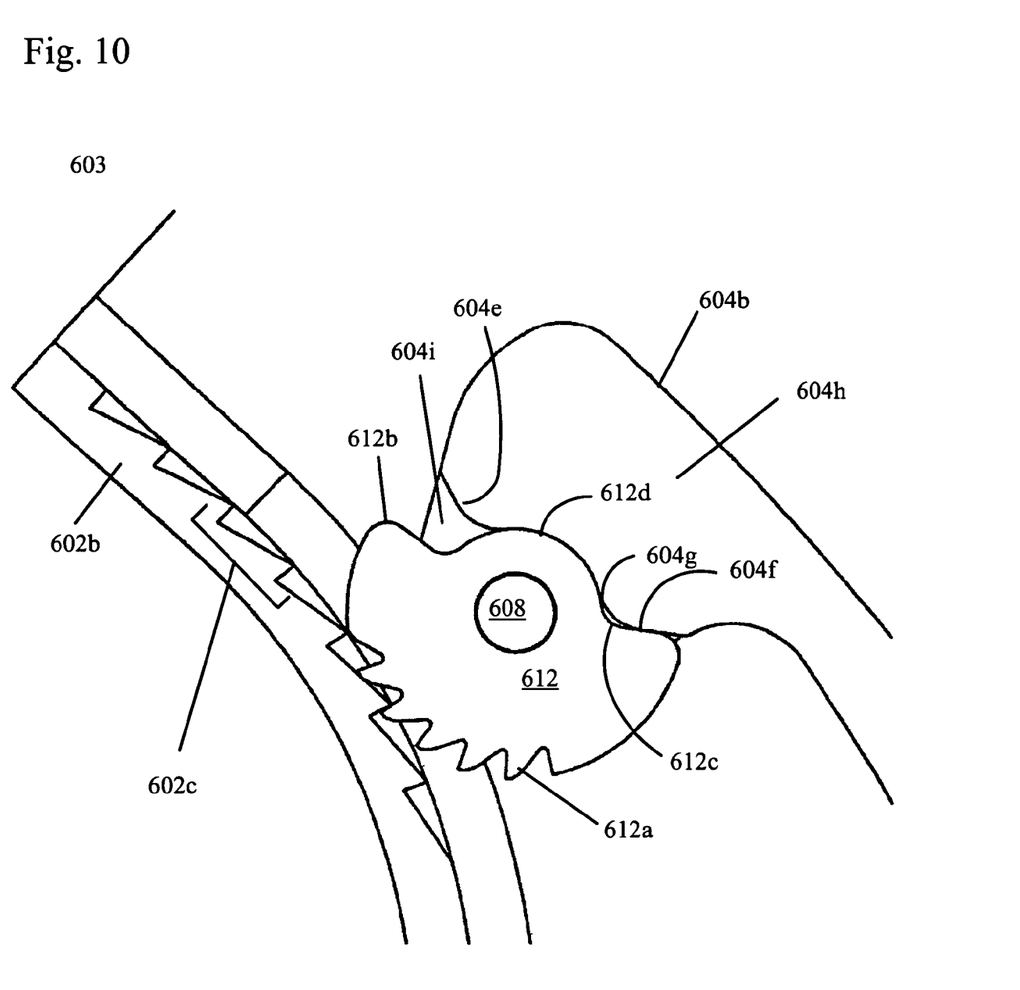
FIG. 10 shows a close-up of the ratcheting portion of the tensioner of FIG. 9.

The distal end 604b, more specifically the ratchet teeth 612a of the ratchet wheel 612 engage teeth 602c on the inner ramp surface 602b of the tensioner side 602a of the bracket 602. As the distal end 604b of the blade shoe 604 moves towards the pivot pin 606 or away from the chain, the ratchet wheel 612 rotates until outer shoulder 612b of the wheel 612 abuts or contacts outer shoulder 604e of the distal end 604b of the blade shoe 604 as shown in FIG. 8, and the ratchet teeth 612a of the ratchet wheel 612 slides from tooth 602c to tooth 602c of the inner ramp surface 602b. The teeth 602c are preferably stepped with ramps 602h and shoulders 602g defining the individual teeth. The combination of the stepped teeth 602c with the ramps 602h in between them, and the distal end 604b of the blade shoe 604, the ratchet wheel 612 is allowed ratcheting travel. When the distal end 604b tries to move away from pivot pin 606 or towards the chain, the backwards travel is limited by the distance the ratchet wheel rotates until the inner shoulder 612c of the wheel 612 abuts or contacts the inner shoulder 604f of the raised portion 604h of the distal end 604b of the blade shoe as shown in FIG. 10 and the length of the ramp 602h of the tooth 602c of the inner ramp surface 602b engages ratchet wheel teeth 612a with shoulder 602g of the next tooth 602c on the ramp surface 602b.

Therefore, the backlash of the system is the combination of the angle the ratchet wheel rotates when starting from a first position where outer shoulders 604e and 612b are contacting to a second position where inner shoulders 604f and 612c are contacting, plus the distance the ratchet wheel teeth 612a slides on ramp 602h of tooth 602c before catching on shoulder 602g of the ramp surface 602b. The amount of backlash is predetermined by the size of the teeth of the ratchet wheel 612, the angle of rotation of the ratchet wheel 612 and the ratchet wheel radius.

When the slack of the chain 600 increases, or the load in the chain decreases, the distal end 604b of the blade shoe 604 moves toward the pivot pin 606 or away from the chain and the ratchet wheel 612 rotates until the outer shoulder 612b of the wheel 612 contacts the outer shoulder 604e of the raised portion 604h of the distal end portion 604b, causing the ratchet teeth 612a to slide down the ramp teeth 602c, towards the pivot pin 606 and the blade shoe 604 to bow out to tension the chain 600.

When the slack of the chain 600 decreases or the load on the chain increases, the distal end 604b of the blade shoe 604 moves away from the pivot pin 606 or towards the chain 600 and the ratchet teeth 612a of the ratchet wheel 612 slide up the teeth 602c of the ramp surface 602b until the ratchet wheel 612 rotates and the inner shoulder 612c of the ratchet wheel contacts the inner shoulder 604f of the raised portion 604h of the distal end 604b. Further movement in this direction is prohibited by both the abutment of the ratchet wheel teeth 612a with the teeth 602c of the ramp surface and the abutment of the inner shoulder 612c of the ratchet wheel 612 with the inner shoulder 604e of the raised portion 604h of the distal end 604b as shown in FIG. 10.

A tab (not shown), integral to the bracket 602 may be bent up and spaced away from the bracket face and towards the center of the bracket 602 to prevent the proximal end 604a of the blade shoe from disengaging pivot pin 606 of the bracket 602.

To pin the tensioner in position for shipping and assembly, pin 610 is inserted into a tab 604d integral to the blade shoe 604 and another tab 602f integral to the bracket 602. The ratchet of the tensioner is unlocked by disengaging the teeth 612a of the ratchet wheel 612 from the ramp teeth 602c of the bracket 602 by using a prying object, such as a locking pin or screw driver.

The inner ramp surface 602c may also be located directly on the engine block.

Figure 9:
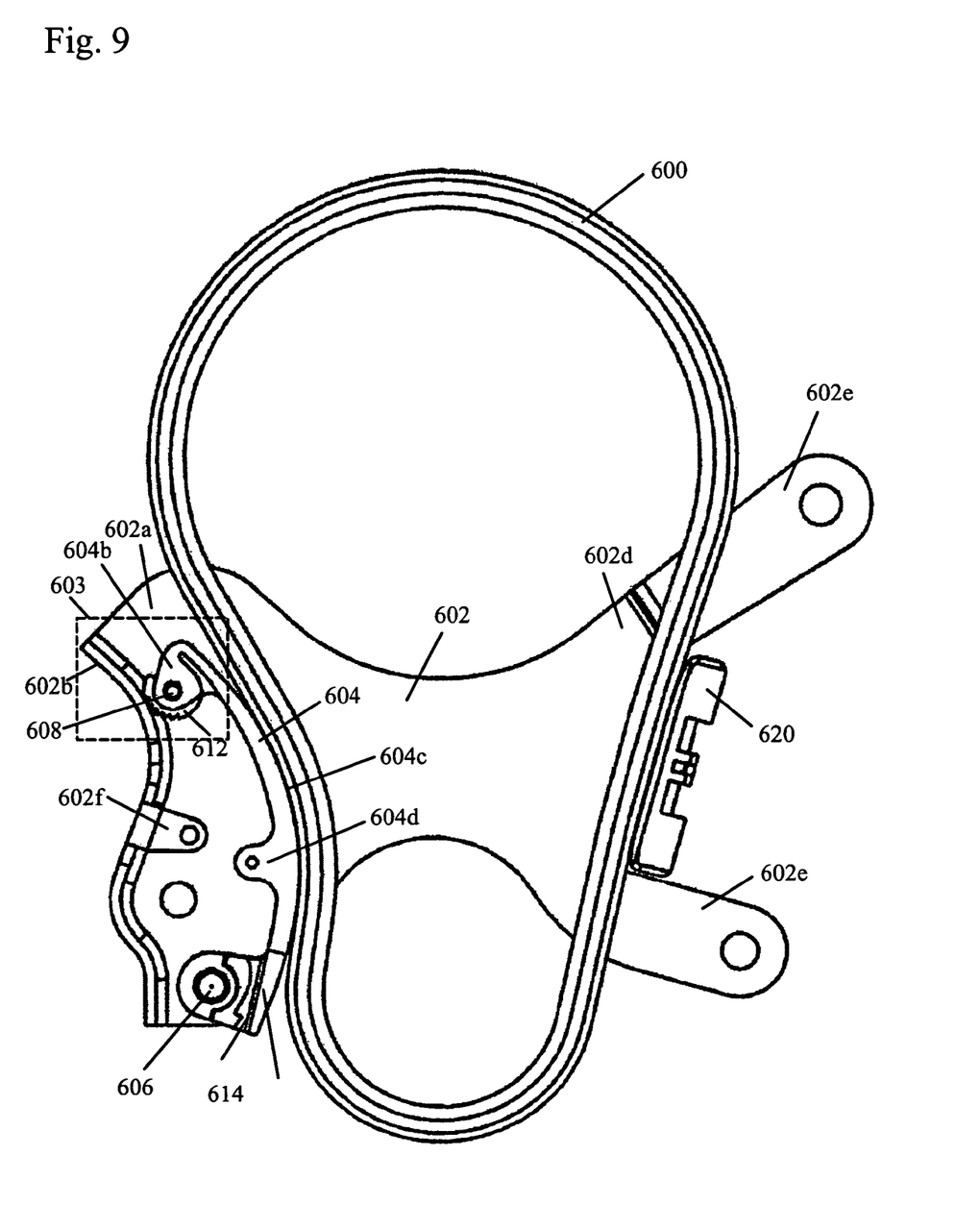
FIG. 9 shows a schematic of the tensioner of the present invention with a worn chain.
Figure 11:
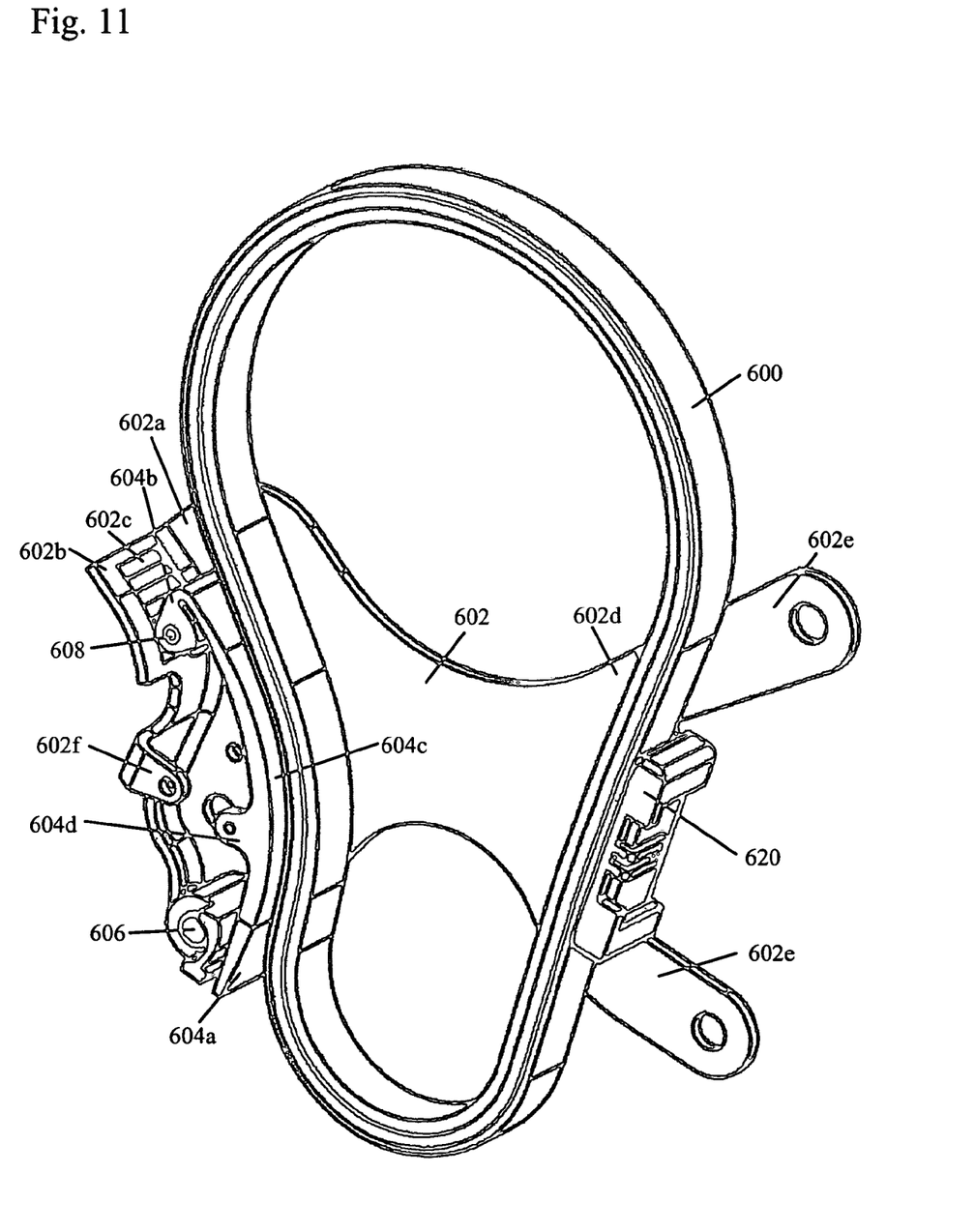
FIG. 11 shows an isometric view of the tensioner with a worn chain.

The tensioner also allows for the additional play and bowing that occurs when a chain 600 becomes worn. As the chain 600 becomes worn, the chain elongates, requiring the blade shoe 604 to arc or bow further to tension the chain. By having the ramp teeth 602c extend a length along the bracket 602b, the ratchet wheel teeth 612a may engage the ramp teeth 602c of the bracket 602b along the entire length of the ramp, including the bottom portion, allowing for the increased bowing necessary to tension a worn and elongated chain as shown in FIGS. 9 through 11.

Since new chains 600 are not yet elongated, the ratchet wheel teeth 612a mostly engages the top portion of the ramp teeth 602c of the bracket 602b to tension the chain 600 as show in FIGS. 7 and 8.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for tensioning a chain comprising:
   a blade shoe having an arcuately curved chain sliding face, a proximal end pivotally attached to a bracket, and a distal end having a raised portion and a recessed portion, with an edge of the raised portion defined by a radial journal in between an inner shoulder and an outer shoulder;

a ratchet wheel pivotally attached to the recessed portion of the distal end of the blade shoe having a plurality of ratchet teeth, an inner shoulder, an outer shoulder, and a reduced diameter portion forming a bearing surface with the radial journal of the raised portion of the distal end;

a ramp surface having a plurality of ramp teeth for slidably receiving the ratchet wheel of the distal end of the blade shoe;

wherein when slack of the chain increases, the distal end of the blade shoe pivots away from the chain and the ratchet wheel rotates until the outer shoulder of the ratchet wheel comes in contact with the outer shoulder of the raised portion of the distal end, allowing the ratchet teeth of the ratchet wheel to slide towards the proximal end of the blade shoe on the plurality of ramp teeth, allowing movement of the distal end of the blade shoe towards the proximal end of the blade shoe and preventing movement in an opposite direction.

2. The tensioner of claim 1, wherein the bracket is an engine block.

3. The tensioner of claim 1, wherein the bracket further comprises a snubber attached opposite the ramp surface for slidably receiving the distal end portion of the blade shoe.

4. The tensioner of claim 1, wherein the ramp surface is on the bracket.

5. The tensioner of claim 1, wherein when the slack in the chain decreases, backlash is a combination of an angle the ratchet wheel rotates from a first position in which the outer shoulder of the ratchet wheel contacts the outer shoulder of the raised portion of the distal end to a second position in which the inner shoulder of the ratchet wheel contacts the inner shoulder of the distal end and a distance between each of the ramp teeth.

6. The tensioner of claim 1, wherein when slack in the chain decreases, the distal end of the blade shoe pivots towards the chain and the ratchet teeth of the ratchet wheel slide up the ramp teeth until the ratchet wheel rotates and the inner shoulder of the ratchet wheel contacts the inner shoulder of the raised portion of the distal end and the ratchet teeth of the ratchet wheel ratchet abut a ramp tooth shoulder, allowing limited movement of the distal end of the blade shoe away from the proximal end of the blade shoe.

7. The tensioner of claim 1, wherein the ramp surface has an upper portion and a lower portion.

8. The tensioner of claim 7, wherein when the chain is new, the plurality of ratchet teeth slide on the upper portion of the ramp surface.

9. The tensioner of claim 7, wherein when the chain is worn, the plurality of ratchet teeth slide on the lower portion of the ramp surface.

10. The tensioner of claim 1, wherein the ratchet wheel is semicircular and has a circular portion and a straight portion.

11. A method of tensioning a worn chain of a tensioner system, the system including a blade tensioner imparting tension to the chain that drivingly connects a driven shaft to a driving shaft in an engine, comprising the steps of:

mounting a blade shoe having an arcuately curved chain sliding face, a proximal end pivotally attached to a bracket with a ramp surface having a plurality of ramp teeth, a distal end having a raised portion and a recessed portion, with an edge of the raised portion defined by a radial journal in between an inner shoulder an outer shoulder such that the arcuately curved chain sliding face contacts a strand of the chain;

pivotally attaching a ratchet wheel to the recessed portion of the distal end of the blade shoe having a plurality of ratchet teeth, an inner shoulder, an outer shoulder, and a reduced diameter portion forming a bearing surface with the radial journal of the raised portion of the distal end;

engaging a ramp surface having a plurality of ramp teeth for receiving the ratchet teeth of the ratchet wheel of the distal end of the blade shoe wherein when slack of the chain increases, the distal end of the blade shoe pivots away from the chain and the ratchet wheel rotates until the outer shoulder of the ratchet wheel comes in contact with the outer shoulder of the raised portion of the distal end, allowing the ratchet teeth of the ratchet wheel to slide on the plurality of ramp teeth of the ramp, allowing movement of the distal end of the blade shoe towards the proximal end of the blade shoe and preventing movement in an opposite direction.

12. The method of claim 11, wherein the bracket further comprises a snubber attached opposite the ramp surface for slidably receiving the distal end portion of the blade shoe.

13. The method of claim 11, wherein the when the slack in the chain decreases, backlash is a combination of an angle the ratchet wheel rotates from a first position in which the outer shoulder of the ratchet wheel contacts the outer shoulder of the raised portion of the distal end to a second position in which the inner shoulder of the ratchet wheel contacts the inner shoulder of the distal end and a distance between each of the ramp teeth.

14. The method of claim 11, wherein when slack in the chain decreases, the distal end of the blade shoe pivots towards the chain and the ratchet teeth of the ratchet wheel slide up the ramp teeth until the ratchet wheel rotates and the inner shoulder of the ratchet wheel contacts the inner shoulder of the raised portion of the distal end and the ratchet teeth of the ratchet wheel abut a ramp tooth shoulder, allowing limited movement of the distal end of the blade shoe away from the proximal end of the blade shoe.

15. The method of claim 11, wherein the ratchet wheel is semicircular and has a circular portion and a straight portion.

* * * * *